United States Patent [19]
Beuermann et al.

[11] Patent Number: 5,638,960
[45] Date of Patent: Jun. 17, 1997

[54] SIEVE

[75] Inventors: Karl-Heinz Beuermann; Reimund Rienecker, both of Heidenheim, Germany

[73] Assignee: J.M. Voith GmbH, Heidenheim, Germany

[21] Appl. No.: 367,331

[22] PCT Filed: Jul. 16, 1994

[86] PCT No.: PCT/EP94/02340

§ 371 Date: Mar. 31, 1995

§ 102(e) Date: Mar. 31, 1995

[87] PCT Pub. No.: WO95/03111

PCT Pub. Date: Feb. 2, 1995

[30] Foreign Application Priority Data

Jul. 22, 1993 [DE] Germany .................. 43 24 662.1

[51] Int. Cl.⁶ .................................................. B07B 1/49
[52] U.S. Cl. .................................................. 209/397
[58] Field of Search ........................... 209/397, 393, 209/268, 269–271, 273, 406, 407

[56] References Cited

U.S. PATENT DOCUMENTS 4,193,503  3/1980  Connolly .
4,529,520  7/1985  Lampenius ................ 209/397
4,717,471  1/1988  Winkler .
5,255,790  10/1993  Einoder .................... 209/393

FOREIGN PATENT DOCUMENTS

| 0042742 | 12/1981 | European Pat. Off. . |
| 2539644 | 7/1984 | France . |
| 2586720 | 3/1987 | France . |
| 2616191 | 11/1976 | Germany . |
| 3327422 | 2/1985 | Germany . |
| 680708 | 10/1992 | Switzerland . |
| WO82/02345 | 7/1982 | WIPO . |

*Primary Examiner*—David H. Bollinger
*Attorney, Agent, or Firm*—Baker & Daniels

[57] ABSTRACT

A screen for sorting fiber suspensions comprising a plurality of screen perforations having a hole type design, with each screen perforation having an ingress area and an egress area for the flow of fiber suspensions, wherein the ingress area is rounded to a convex curvature. The convex curvature increases the velocity of the fiber suspensions through the screen thereby reducing clogging of the suspensions in the screen and increasing the throughput and the sorting integrity of the screen. Alternative embodiments of the screen include an area of constant cross section connecting the ingress area and the egress area, and transitional edges formed in the transition areas.

25 Claims, 1 Drawing Sheet

SIEVE

BACKGROUND OF THE INVENTION

The invention concerns a screen, specifically a screen basket for sorting fiber suspensions. Known from U.S. Pat. No. 4,717,471 is a screen where the entrance area of the perforations is heavily flared in the shape of a funnel, the opening of the funnel having a very large angle, of more than 120 degrees, and perforations being round holes or orifices.

There are also screens formed by a parallel arrangement of rods, which form the screen duct or leave appropriate voids between them (DE 3,327,422).

A similar screen is known from U.S. Pat. No. 4,193,503, where the outlet side of the screen element is rounded in a convex fashion. But this screen type can only be used in conjunction with a virtually ribbed screen surface where the ribbing extends transverse to the major direction of flow along the screen surface. This arrangement imparts a wavy movement to the fiber suspension to concentrate the fibers and other more lightweight materials in an upper layer, i.e., at a greater distance from the screen surface, thus preventing these lightweight substances from passing through the screen perforations. This effect is contrary to the effect desired by the present invention, which is to sort the fibers—notably paper or cellulose fibers—out through the screen perforations, but prevent particles having dimensions greater than the desired fibers from passing through the screen surface.

The screen of DE 3,327,422 is susceptible to cloggings on the screen edges formed by the tilted rods. With such screens it is known that the throughput and the sorting integrity decrease with the sharpness of the profile while the susceptibility to clogging, for instance to cellulose buildup, increases.

The problem underlying the present invention is to reduce the susceptibility to clogging and increase sorting integrity during the sorting operation.

SUMMARY OF THE INVENTION

The inventional solution to the problem is characterized by a screen having a plurality of screen perforations having a funnel design wherein at least a part of the perforation ingress area is rounded to a convex curvature.

The convex design of at least part of the ingress area of the screen perforation results in a cross-sectional constriction in the direction of flow. The constriction increases the velocity of the liquid directed through the aperture, and thus improves the removal of lightweight paper or cellulose fibers by the screen perforations. The rounding in the ingress area offers the further advantage of reducing the flow resistance to the fiber suspension passing through the screen, with fibers of paper and cellulose contained in it. Owing to the favorable cross-sectional transitions, a stoppage of the fiber suspension flow through the screen perforation can be greatly avoided. Moreover, the inventional design of the screen perforation makes it possible to avoid clogging of the perforations. The screen surface remains smooth and is not wavy as in the prior art. The rounding may also feature approximate shapes, for instance of partial ellipses rather than radii. The screen perforation ingress area is the area extending from the screen entry in the pass-through direction, while the egress area is the area which is located in the area of discharge. No specifications are made, however, as regards the relations between the two areas.

The convex shape of parts of the ingress area, or of the entire ingress area, can be described by at least one radius or a plurality of different, successive radii. Viewed cross-sectionally, the convex areas may have the shape of a circular arc, partial areas of ellipses etc.

The distance between the centers of the screen perforations is preferably at least 3.5 times the cross section of the perforation at its narrowest point, specifically transverse to the generatrix of the peripheral surface of the screen basket (envelope). Transverse to the perforation, the spacing may be less, so that for instance the rounding radii of adjacent holes touch tangentially, or even less. The rounding may also be effected such that the cross section of the hole ingress area—transverse to the hole center axis (longitudinal axis) —is an ellipse or composed of circular arcs.

Specifically, there are several embodiment options for screen perforations with the inventional design of the ingress area. These include:

1. Screen perforations having ingress areas that narrow cross-sectionally, in funnel fashion in the direction of flow with at least part of the ingress area being convex, and an adjacent diffuser type expansion toward the screen exit;
2. an embodiment with a cross section in which the ingress area narrows in funnel fashion in the flow direction, with at least part of the ingress area being convex, with an area of constant cross section adjacent to the ingress area and bounding on that area an area with diffuser type expansion toward the screen exit.

Viewed cross-sectionally, the ingress area, or the part of the ingress area with a convex curvature, can be described by at least one radius or by a plurality of different radii. The ingress area can then be followed by an area with constant cross section or by an egress area extending in flow direction toward the exit and having a cross section that expands in diffuser fashion. For the various partial areas, or their succession, there are two options. One design joins the areas such that no transitional edges are created. This is possible because of the convex shaping of the ingress area, the area between the ingress area and the adjacent area with a constant cross section or the area between the ingress area and the area in which the opening cross section expands in diffuser fashion. Another design option comprises a succession of abrupt cross-sectional changes and, thus, the creation of transitional edges, notably in the transitional area between the ingress area and the area of constant cross section and the egress area. A particular embodiment comprises a succession of funnel-shaped constrictions of the egress area in the flow direction and the exit opening flaring in funnel fashion. A concurrent option is giving the transition between convex ingress area and egress area flaring in diffuser fashion a curved design. When joining the individual sections such that the following area bounds with its contours tangentially on the preceding area, there are no uneven transitions, and thus no transitional edges in the screen perforation.

The appropriate design and use reside within the discretion of the average expert.

BRIEF DESCRIPTION OF THE DRAWING

The inventional solution to the problem is explained hereafter with the aid of the following figures.

DETAILED DESCRIPTION

Figure 1:
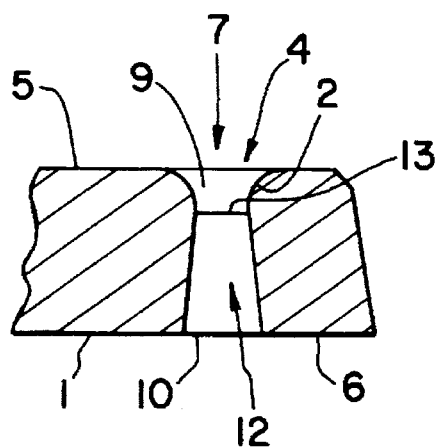
FIG. 1, an embodiment of a section of a screen surface with a convex ingress area according to the present invention.

FIG. 1 illustrates a single screen perforation comprising a hole 4, having an ingress area 9 which is machined in screen plate 1 representing the screen surface. The entire screen perforation 4 possesses on its entry side an expansion which is formed by rounding 2 of ingress area 9 of screen perforation 4. Screen surface 1, has entry side 5 and exit side 6. The flow through screen perforation 4 is in the direction of arrow 7. Rounding radius 2 ranges between 0.5 and 3 mm, preferably between 0.5 and 2.5 mm.

Following ingress area 9, screen perforation 4 expands in diffuser fashion toward exit 10. This expansion forms egress area 12 in the area of exit 10.

The transition between ingress area 9 and the adjacent diffuser type expansion may be uniform, that is, the diffuser type expansion borders tangentially on rounding 2 or the transition may involve a transitional edge 13.

Figure 2:
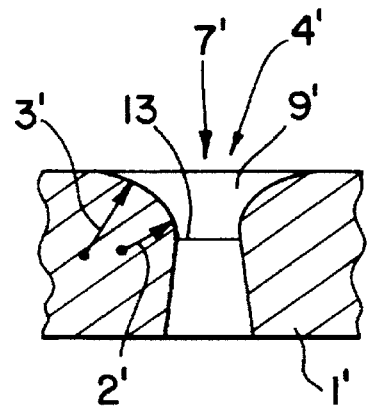
FIG. 2, a second embodiment of a convex ingress area, the curvature of the ingress area contour allowing description by different radii.

In FIG. 2, identical parts are referenced identically, but with a prime sign suffix. Ingress area 9' of screen perforation 4' has two rounding radii 2' and 3', the smaller radius being situated closer to the transition, notably transitional edge 13'. The stated radius sizes relate preferably to radius 2' that is closer to transitional edge 13'. Transitional edge 13 generally is at the narrowest cross section of screen perforation 4' and the flow cross section increases again thereafter—a measure that prevents particles from lodging in the screen perforation.

The radii may be reduced farther still, with very thin plate, and amount, e.g., to only 0.2 mm. The radii relate not only to the screen perforations, but also to screen slots. FIG. 1 and 2 could just as well be cross sections of screen slots, in which case the cross section is viewed transverse to the longitudinal direction of the screen slots.

The inventional screens are intended for sorting fiber suspensions, with the fibers (cellulose or paper) passing through the screen perforations to the egress side.

Figure 3:
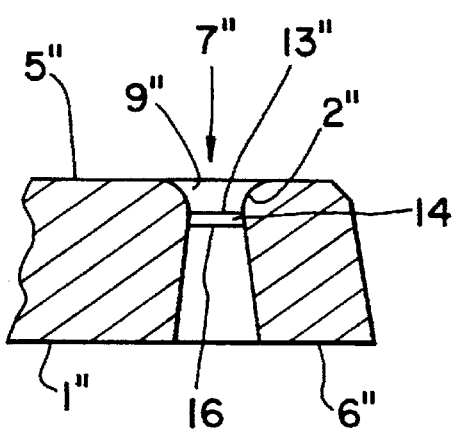
FIG. 3, a third embodiment with an ingress area of convex design and a following area of constant cross section.

FIG. 3 illustrates another option comprising ingress area 9" which narrows in funnel fashion to an area of constant cross section 14. The transitions between ingress area 9", the area of constant cross section 14 and/or the area of constant cross section 14 plus diffuser type expansion may be of a design that do not allow tangential joining, but form transitional edges 13" or 16.

Figure 4:
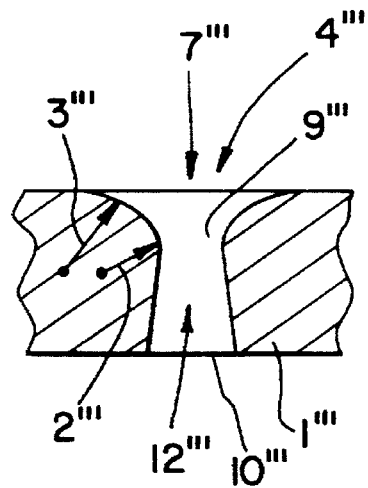
FIG. 4, a fourth embodiment where the transition between the ingress area and the egress area is convex as well.

FIG. 4 shows a screen perforation 4''' that features an area that narrows in funnel fashion and is followed by an area that expands toward exit 10'''. The juncture of the diffuser type expansion resembles a Venturi nozzle such that an even transition is achieved between the partly convex ingress area and the egress area which normally flares in diffuser fashion. The even transition is accomplished by having the diffuser type expansion, and thus egress area 12''', border tangentially on ingress area 9''', so that no cross-sectional jumps are created.

The screen perforations illustrated here feature in addition to an expanded entrance a diffuser type expansion in the exit direction. This is a preferred design. Conceivable as well are embodiments with constant cross section up to the exit following the ingress area.

We claim:

1. A screen for sorting fiber suspensions, comprising;
a plurality of screen perforations, each said screen perforation having an ingress area and an egress area, said ingress area having a design which in the flow-through direction narrows in funnel fashion wherein
at least a part of said ingress area is rounded to a convex curvature.

2. Screen according to claim 1, wherein all of said ingress area of each said screen perforation is rounded to a convex curvature.

3. Screen according to claim 2, wherein said ingress area is rounded to a convex curvature that comprises two partial curvatures, each said partial curvature having a different radius.

4. Screen according to claim 3, wherein the center of the smaller radius of said convex curvature is disposed closer to the egress area than the larger radius in the flow direction.

5. Screen according to claim 2, wherein said screen perforations flare in the egress area an expanding cross-sectional area in the flow-through direction.

6. Screen according to claim 2, wherein the transition between said ingress area and said egress area is designed to form a transitional edge.

7. Screen according to claim 2, wherein the transition between said ingress area and said egress area is rounded to a convex curvature.

8. Screen according to claim 3, wherein said screen perforations flare in the egress area an expanding cross-sectional area in the flow-through direction.

9. Screen according to claim 3, wherein the transition between said ingress area and said egress area is designed to form a transitional edge.

10. Screen according to claim 3, wherein the transition between said ingress area and said egress area is rounded to a convex curvature.

11. Screen according to claim 4, wherein said screen perforations flare in the egress area an expanding cross-sectional area in the flow-through direction.

12. Screen according to claim 4, wherein the transition between said ingress area and said egress area is designed to form a transitional edge.

13. Screen according to claim 4, wherein the transition between said ingress area and said egress area is rounded to a convex curvature.

14. Screen according to claim 1, wherein each said screen perforation flares in said egress area with an expanding cross-sectional area in the flow-through direction.

15. Screen according to claim 14, wherein, viewed in the flow-through direction, an area with a constant cross section is provided between said ingress area and said egress area.

16. Screen according to claim 15, wherein the transition between said ingress area and said area of constant cross section is designed to form a transitional edge.

17. Screen according to claim 16, wherein the transition between said area of constant cross section and said egress area is designed to form a transitional edge.

18. Screen according to claim 14, wherein the transition between said ingress area and said egress area is designed to form a transitional edge.

19. Screen according to claim 14, wherein the transition between said ingress area and said egress area is rounded to a convex curvature.

20. Screen according to claim 15, wherein the transition between said ingress area and said area of constant cross section and/or said area of constant cross section and said egress area are designed to form a transitional edge.

21. Screen according to claim 15, wherein the transition between said area of constant cross section and said egress area is designed to form a transitional edge.

22. Screen according to claim 21, wherein the transition between said area of constant cross section and said egress area is rounded to a convex curvature.

23. Screen according to claim 16, wherein the transition between said ingress area and said area of constant cross section is rounded to a convex curvature.

24. Screen according to claim 1 wherein the transition between said ingress area and said egress area is designed to form a transitional edge.

25. Screen according to claim 1 wherein the transition between said ingress area and said egress area is rounded to a convex curvature.

* * * * *